April 12, 1949.  G. L. HOBROUGH  2,467,261
PHONOGRAPH TURNTABLE DRIVE
Filed Nov. 19, 1945  2 Sheets-Sheet 1

Inventor.
G. L. Hobrough

April 12, 1949. G. L. HOBROUGH 2,467,261
PHONOGRAPH TURNTABLE DRIVE
Filed Nov. 19, 1945 2 Sheets-Sheet 2

Inventor.
G. L. Hobrough
by H. J. S. Dennison
atty.

Patented Apr. 12, 1949

2,467,261

UNITED STATES PATENT OFFICE 2,467,261

PHONOGRAPH TURNTABLE DRIVE

Gilbert L. Hobrough, Lucknow, Ontario, Canada, assignor to Danforth Radio Company Limited, Toronto, Ontario, Canada Application November 19, 1945, Serial No. 629,573

4 Claims. (Cl. 74—206)

This invention relates to improvements in the mechanism for operating the turntable of phonograph machines and the principal object of the invention is to ensure a uniform rate of speed of the turntable and consequent uniform reproduction of the recording placed on the turntable irrespective of variation of load placed upon the table.

In the construction of electrically operated phonographs the conventional drive employs an idler wheel with a rubber tire arranged between the motor drive wheel and the inner peripheral surface of the turntable rim, the idler wheel being supported upon a pivotally mounted plate. The thrust of the drive wheel of the motor driving the idler wheel serves to increase the contact pressure of the tire of the idler wheel against both the drive wheel and the turntable rim.

The principal feature of the present invention is to apply a variable braking pressure to the idler wheel affected by variation in load applied to the turntable so that the braking drag on the idler wheel equalizes the change in loading, thereby rendering the motor load independent of the loading of turntable.

In the accompanying drawings

Figure 1:
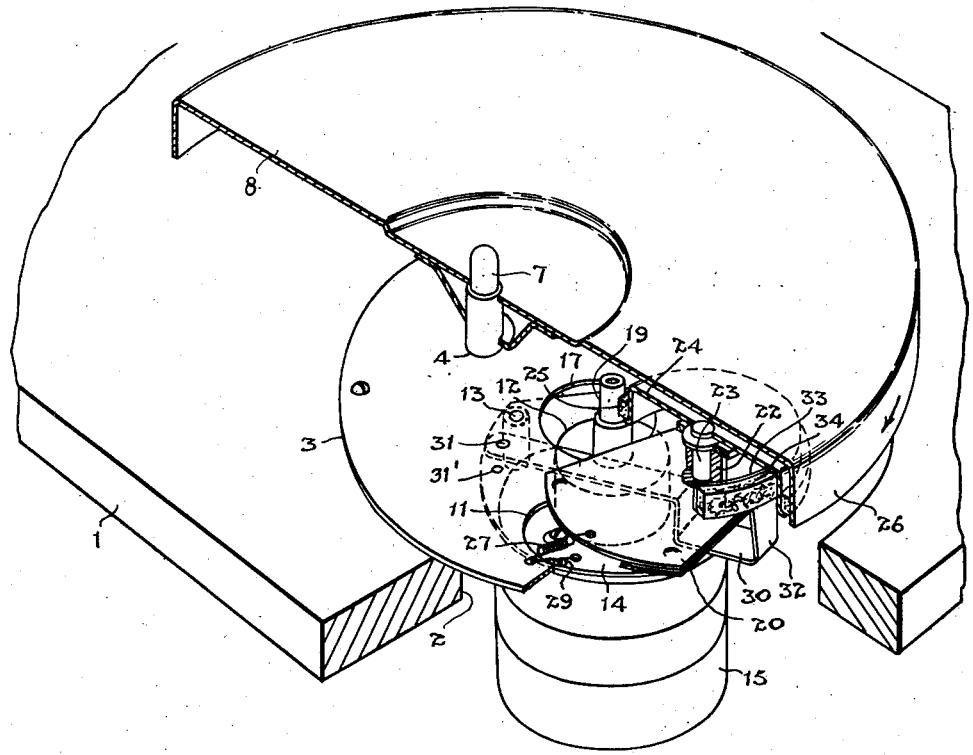
Figure 1 is a sectional perspective view through the turntable and the idler wheel drive thereof illustrating the relative position in perspective of the motor drive and the supporting plate.
Figure 2:
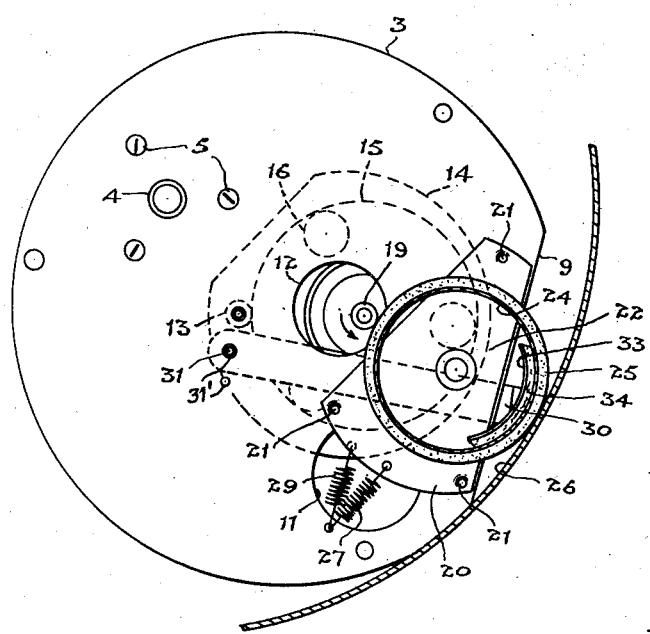
Figure 2 is a plan section taken partly through the rim of the turntable and of the idler drive arranged between the turntable rim and motor.
Figure 4:
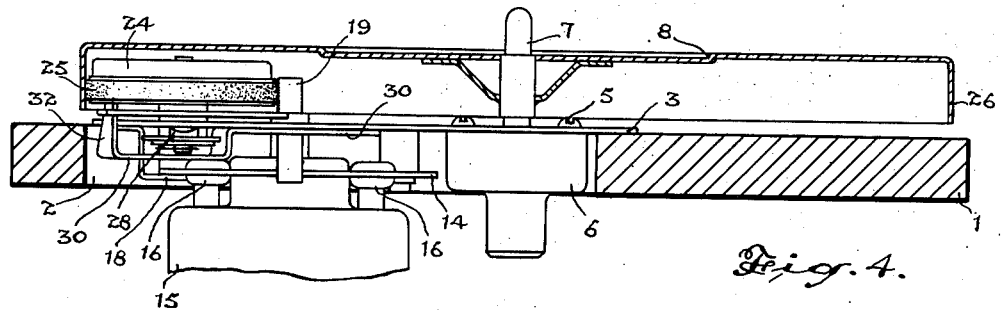
Figure 4 is a sectional elevational view through the turntable showing the relative position of the driving motor, the idler wheel between the driving motor and the turntable rim and the shiftable brake.
Figure 3:
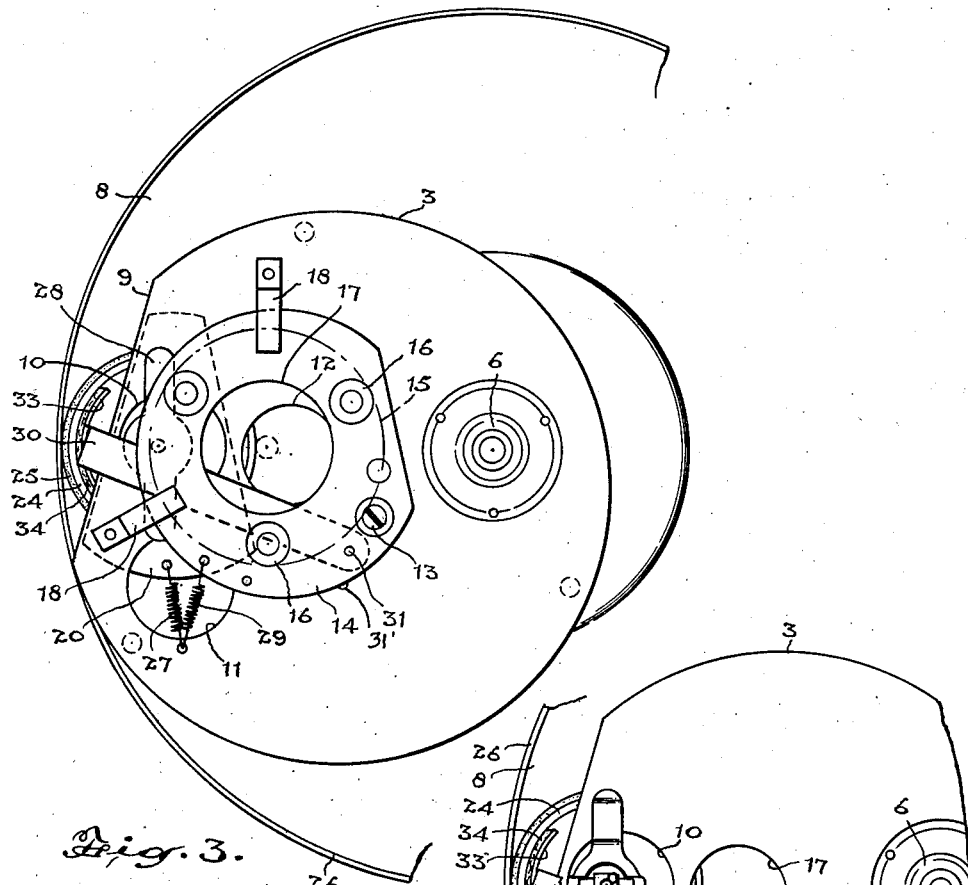
Figure 3 is an underside plan view showing the relative arrangement of the motor, the idler drive, the engaging rim of the turntable and a compensating braking means.
Figure 5:
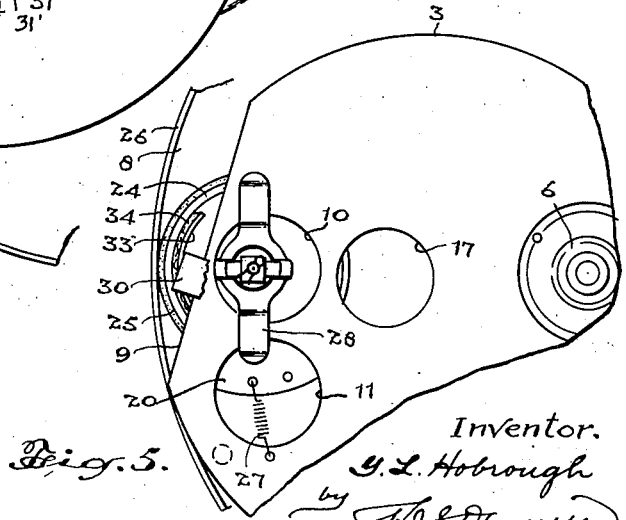
Figure 5 is an underside plan detail of the floating support for the idler wheel.

In the construction of motor driven phonographs such as herein shown the platform or cabinet top 1, above which the turntable for carrying the records to be reproduced is mounted, is provided with an opening 2.

A plate 3 of substantially circular form and of greater dimensions than that of the opening 2 is secured at the top of the platform over said opening.

Arranged off-centre of the plate 3 is an opening 4 and aligned therewith and secured by screws 5 is a journal bearing 6 which is adapted to receive and support the spindle 7 of the turntable 8.

At a point remote and substantially opposite from the opening 4 the plate 3 is cut away presenting a flat edge 9. Arranged adjacent to the flat edge 9 are circular holes 10 and 11 cut in the plate 3 and arranged angularly inward from these holes is a third hole 12.

A stud 13 is rigidly secured in and extends downwardly from the plate 3 and this stud is spaced inwardly from the hole 12. Pivotally mounted upon the stud 13 and spaced below the plate 3 is a substantially circular plate 14 to which an electric motor 15 is secured by suitable flexible gaskets 16, the central bearing and the shaft of the motor extending upwardly through an opening 17 arranged centrally in the motor plate.

The motor plate 14 is supported on the side opposite to the stud support by angle brackets 18 secured to the underside of the plate 3, the motor plate sliding on the upper and inwardly projecting portion of said brackets.

The upper end of the motor shaft 19 forms a driving pulley.

A plate 20 of substantially triangular formation rests upon the top of the plate 3 and is provided with detents 21 in each corner to form antifriction bearing points upon which this plate slides. The plate 20 is formed with a central bearing boss 22 and in this is journalled the spindle 23 of an idler pulley 24.

The pulley 24 is provided with a flanged perimeter on which is mounted a circular band rubber tire 25. This rubber tire engages the pulley end 19 of the motor shaft and it also engages the inner peripheral surface of the flange 26 of the turntable 8 to drive the turntable.

A small coil tension spring 27 is connected at one end to the broad end of the plate 20 and extends across the hole 11 and is secured to the plate 3 and exerts a tensional pull on the plate 20 and the spindle carried thereby to draw the rubber-tired idler pulley 24 and brake shoe into operating contact.

The spindle 23 of the idler pulley 24 extends through the hole 10 in the plate 3 and it is supported on the underside by a flexible spring crossbar 28. The spindle can thus oscillate or move about within the hole 10 quite freely.

The plate 14, which supports the motor and is pivotally mounted on the stud 13, is spring-urged in a direction to hold the motor shaft spindle in contact with the idler pulley by a coil tension spring 29 which extends part way through the hole 11 and is connected to the plate 3 adjacent to the connection of the spring 27, both springs thus pulling in the same direction.

The conception thus far described is not entirely novel and has been used to a material extent in phonograph motor drives. A radically new element has however been added to this drive which accomplishes a most desirable effect. This new element comprises a pivotal arm 30, here shown of a flat metal bar, provided with a pin 31, at its inward end which engages one of the holes 31' in the plate 3 at a point adjacent to the centre of the stud 13 which forms the pivot upon which the motor plate 14 swings. Thus the pivot point of the arm 30 may be adjusted by locating the pin 31 in the various holes 31'.

The outward end of the arm 30 is turned upwardly and the extremity of the upturned end 32 is formed into an arc-shaped shoe 33 which extends upwardly inside the flange of the idler pulley 24 and is provided with a shoe 34 of felt or similar material which is preferably soaked in oil.

The pivotal mounting of the motor plate 14 is such that the thrust or reaction of the motor drive pulley produced when it drives the idler wheel serves to increase the contact pressure of the tire of said idler wheel against both the drive pulley and the turntable rim, the spring 29 supplying the initial pressure required for starting.

The spring 27, connected to the plate 20 carrying the idler wheel, pulls the idler wheel into pressure contact with the brake shoe 34 and the oil-soaked surface of said brake shoe provides a uniform drag on the idler wheel when the table is not loaded.

The relative relation of the motor pulley, the idler wheel, the turntable flange and the brake shoe are such that the thrust or reaction of the idler wheel in driving the turntable serves to decrease the braking pressure. Therefore the drag applied to the idler wheel is also decreased.

In the event of an increase in the force applied to rotate the turntable the idler wheel reaction increases and this in turn decreases the drag on the idler wheel. Conversely any decrease in turntable loading increases the drag on the idler wheel.

It will therefore be understood that an arrangement of the pivoting of the motor-supporting plate and the pivot support of the brake as well as the arrangement of the idler wheel support may be chosen so that the change in drag upon the idler wheel can be made to equalize with the change in loading. Under such condition any change in turntable loading is completely compensated for by the opposite change in idler wheel drag, consequently the motor load is independent of the loading of the turntable.

It is of course understood that the speed of a motor varies slightly with the changes of motor load and also that slippage between the motor pulley and the idler and between the idler and the turntable increases with the load.

With the use of the combined arrangement of the pivotal motor support, the floating idler wheel and the pivotal brake, changes in turntable speed due to changes in turntable loading are eliminated and whether one or more records are placed upon the turntable, the turntable will operate effectively at uniform speed and a true reproduction of the recording will be made.

A device such as described is extremely simple but it has been proven in practice to be very dependable. The load compensation control described takes care of the difference in weight of pick-up as also it takes care of the load on the turntable and from outside to inside of records the speed of the turntable remains the same.

What I claim as my invention is:

1. In a phonograph, the combination with a turntable, of a driving motor floatably supported, an idler pulley floatably interposed between said motor and said turntable and forming a driving connection therebetween, a lever pivotally mounted beyond the perimeter of said idler and extending thereacross, and a shoe mounted on the free end of said pivotal lever and engaging the inner perimeter of said idler to retard the rotation of said idler and turntable.

2. In a phonograph, the combination with a flanged turntable, of an idler pulley floatably supported with its outer perimeter engaging the inner wall of said flange, a motor having a pulley engaging the periphery of said idler, said motor being mounted to swing in a horizontal plane toward said idler, spring means for urging said motor toward said idler, spring means for urging said idler toward the flange of said turntable, and a brake member pivotally supported at a point beyond the perimeter of said idler and having a convex braking surface to engage the inner perimeter of said idler whereby said brake shoe moves to accommodate movement of said idler while maintaining a substantial portion of its convex surface in braking engagement therewith.

3. In a phonograph, the combination with a flanged turntable, of an idler pulley floatably supported with its perimeter engaging the inner wall of said flange, a motor having a pulley engaging the periphery of said idler, said motor being pivotally mounted for its driving pulley to swing in a horizontal arc toward the periphery of said idler, spring means for assisting the eccentric movement of said motor, spring means for urging said idler toward the flange of the turntable, and a brake member pivotally mounted on a centre beyond said idler and having a shoe engaging the inner perimeter of said idler.

4. In a phonograph, a mounting plate, a motor plate pivotally mounted eccentrically from said mounting plate, a motor supported on said pivotal motor plate and having its shaft extending above said mounting plate, a plate slidably mounted on said mounting plate, a flanged idler pulley mounted on said slidable plate and having its periphery engaging said motor shaft, a turntable rotatably mounted on said mounting plate and having a flange engaging said idler, spring means for urging said motor shaft toward said idler and said idler toward said turntable flange, an arm pivotally secured to said mounting plate having an end extending within said idler, and a shoe mounted on said arm extension and arranged within the flange of said idler to engage same and retard the movement of said turntable when operating at less than maximum load.

GILBERT L. HOBROUGH.

REFERENCES CITED

The following references are of record in the file of this patent:

UNITED STATES PATENTS

| Number | Name | Date |
|---|---|---|
| 349,362 | Roots | Sept. 21, 1886 |
| 1,889,947 | Carlson | Dec. 6, 1932 |
| 2,161,148 | Erwood | June 6, 1939 |
| 2,261,889 | Schneider | Nov. 4, 1941 |
| 2,307,475 | Underhill | Jan. 5, 1943 |